US012676065B2

(12) United States Patent
Monegan

(10) Patent No.: US 12,676,065 B2
(45) Date of Patent: Jul. 7, 2026

(54) SYSTEM AND METHOD FOR VEHICLE-TO-VEHICLE OPEN PARKING SPOTLIGHT

(71) Applicant: TOYOTA MOTOR ENGINEERING & MANUFACTURING NORTH AMERICA, INC., Plano, TX (US)

(72) Inventor: Mackensie M. Monegan, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 166 days.

(21) Appl. No.: 18/538,883

(22) Filed: Dec. 13, 2023

(65) Prior Publication Data

US 2025/0201124 A1 Jun. 19, 2025

(51) Int. Cl.
*G08G 1/14* (2006.01)

(52) U.S. Cl.
CPC .................................... *G08G 1/146* (2013.01)

(58) Field of Classification Search
None
See application file for complete search history.

(56) References Cited

U.S. PATENT DOCUMENTS

| | | | | |
|---|---|---|---|---|
| 10,384,718 | B1 | 8/2019 | Kentley-Klay | |
| 10,424,204 | B1 * | 9/2019 | Han | G01S 13/931 |
| 10,691,954 | B2 | 6/2020 | Beals | |
| 10,713,944 | B2 | 7/2020 | Espinosa Cardenas | |
| 11,299,091 | B2 | 4/2022 | Hartmann | |
| 11,715,375 | B2 | 8/2023 | Chen | |
| 2017/0025008 | A1 | 1/2017 | Gignac | |
| 2017/0106793 | A1 | 4/2017 | Kumar | |
| 2018/0211539 | A1 * | 7/2018 | Boss | G08G 1/168 |
| 2020/0035101 | A1 * | 1/2020 | Brooks | G08G 1/143 |
| 2023/0113427 | A1 | 4/2023 | Koravadi | |
| 2025/0083662 | A1 * | 3/2025 | Alarcon | G08G 1/168 |

FOREIGN PATENT DOCUMENTS

| | | | |
|---|---|---|---|
| EP | 1916153 | B1 | 4/2008 |

* cited by examiner

*Primary Examiner* — John F Mortell
(74) *Attorney, Agent, or Firm* — HAYNES AND BOONE, LLP

(57) ABSTRACT

Methods and systems of the present disclosure allow vehicles and infrastructure to identify an open parking space using one or more sensors. Once an open parking space is identified, a user of a vehicle or mobile device can reserve the open parking space in advance of arrival at the open parking space by accessing a parking application executed on the user's vehicle or mobile device. One or more light projection devices associated with the vehicles and the infrastructure surrounding the open parking spaces and reserved parking spaces are able to project one or more images onto the parking spaces to help identify the parking spaces to users and vehicles navigating a parking garage or parking lot. If a reserved parking space is inadvertently occupied by a vehicle that is not associated with the reserved parking space, the parking application can recommend additional open parking spaces to the user.

18 Claims, 10 Drawing Sheets

SYSTEM AND METHOD FOR VEHICLE-TO-VEHICLE OPEN PARKING SPOTLIGHT

FIELD OF THE DISCLOSURE

The present disclosure relates generally to an open parking spotlight and, more particularly, to systems and methods for identification of open parking spaces using vehicle-to-vehicle ("V2V") and/or vehicle-to-infrastructure ("V2I") communications and sensors and light projection systems associated with vehicles and infrastructure adjacent the open parking spaces.

BACKGROUND

Some applications exist that allow vehicle owners or drivers to reserve parking spaces before arriving at a parking garage or parking lot; however, these applications do not visually highlight or indicate the reserved parking space. As a result, the reserving driver may have a difficult time finding the reserved parking space or other drivers may not recognize the parking space as reserved and may inadvertently park in the reserved parking space. Other parking garages and parking lots may not have the option to reserve a parking space, but it may still be desirable to highlight or otherwise identify open parking spaces to enable drivers to find open parking spaces more efficiently.

As such, it would be desirable for parked cars or other infrastructure in a parking garage or parking lot to be able to identify open parking spaces and visually highlight the open parking spaces to help drivers find the open parking spaces more efficiently. It would also be desirable for a driver to be able to reserve a parking space ahead of time via an application, and for that reservation to be communicated to the parked cars and infrastructure in the parking garage or parking lot so that the reserved parking space can be visually highlighted by the parked cars and infrastructure adjacent the reserved parking space as unavailable for all vehicles except the reserving vehicle.

SUMMARY

In view of the foregoing, the present disclosure provides a computer-implemented method for identification of a reserved parking space, including identifying, using one or more sensors, an open parking space; reserving, using an application, the open parking space for a designated vehicle such that the open parking space becomes a reserved parking space associated with the designated vehicle; and projecting, using one or more light projection devices, an image onto the reserved parking space. In another aspect of the present invention, the one or more sensors are associated with a first vehicle that is adjacent the open parking space. In another aspect of the present invention, the one or more sensors are associated with infrastructure that is adjacent the open parking space. In another aspect of the present invention, the method further includes transmitting information associated with the open parking space to a server in communication with the application. In another aspect of the present invention, the application is executed on the designated vehicle. In another aspect of the present invention, the application is executed on a mobile device. In another aspect of the present invention, the method further includes transmitting information associated with the reserved parking space to a server in communication with the application and the one or more sensors. In another aspect of the present invention, the one or more light projection devices are associated with a first vehicle that is adjacent the reserved parking space. In another aspect of the present invention, the one or more light projection devices are associated with infrastructure that is adjacent the reserved parking space. In another aspect of the present invention, the method further includes projecting, using the one or more light projection devices, a first image onto the reserved parking space; and projecting, using the one or more light projection devices, a second image onto the reserved parking space when the designated vehicle is in close proximity to the reserved parking space, wherein the second image is different from the first image. In another aspect of the present invention, the method further includes adjusting, using the one or more light projection devices, a brightness of the image projected onto the reserved parking space.

The present disclosure also provides a computer-implemented method for identification of a reserved parking space, including identifying, using a first sensor associated with a first vehicle, an open parking space adjacent the first vehicle; transmitting, from the first vehicle to a second vehicle via a vehicle-to-vehicle ("V2V") communication network, information associated with the open parking space; reserving, using an application executed on the second vehicle, the open parking space for the second vehicle such that the open parking space becomes a reserved parking space associated with the second vehicle; transmitting, from the second vehicle to the first vehicle via the V2V communication network, reservation information associated with the reserved parking space; and projecting, using a first light projection device associated with the first vehicle, a first image onto the reserved parking space. In another aspect of the present invention, the method further includes identifying, using a second sensor associated with infrastructure, the open parking space adjacent the infrastructure. In another aspect of the present invention, the method further includes transmitting, from the infrastructure to the second vehicle via a vehicle-to-infrastructure ("V2I") communication network, the information associated with the open parking space. In another aspect of the present invention, the method further includes transmitting, from the second vehicle to the infrastructure via the V2I communication network, the reservation information associated with the reserved parking space. In another aspect of the present invention, the method further includes projecting, using a second light projection device associated with the infrastructure, the first image onto the reserved parking space. In another aspect of the present invention, the method further includes projecting, using the first light projection device, a second image onto the reserved parking space when the second vehicle is in close proximity to the reserved parking space; wherein the second image is different from the first image.

The present disclosure also provides a computer-implemented method for identification of a parking space, including identifying, using a first sensor associated with a first vehicle, an open parking space adjacent the first vehicle; transmitting, from a second vehicle to the first vehicle via a vehicle-to-vehicle ("V2V") communication network, a location of the second vehicle; projecting, using a first light projection device associated with the first vehicle, a first image onto the open parking space when the second vehicle is in close proximity to the open parking space; wherein the first image identifies the open parking space as available to the second vehicle. In another aspect of the present invention, the method further includes identifying, using a second sensor associated with a third vehicle, a second open parking space adjacent the third vehicle; transmitting, from the second vehicle to the third vehicle via the V2V communication network, the location of the second vehicle; projecting, using a second light projection device associated with the third vehicle, a second image onto the second open parking space when the second vehicle is in close proximity to the second open parking space; wherein the second image identifies the second open parking space as available to the second vehicle. In another aspect of the present invention, the first image and the second image are projected simultaneously onto the first open parking space and the second open parking space, respectively, when the second vehicle is in close proximity to both the first open parking space and the second open parking space.

Another aspect of the present disclosure provides a non-transitory computer-readable medium having stored thereon machine-readable instructions executable to cause a machine to perform any of the methods described herein.

DESCRIPTION OF ILLUSTRATIVE EMBODIMENTS

Illustrative embodiments and related methods of the present disclosure are described below as they might be employed in a system and method for visually identifying open and reserved parking spaces. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

Figure 1:
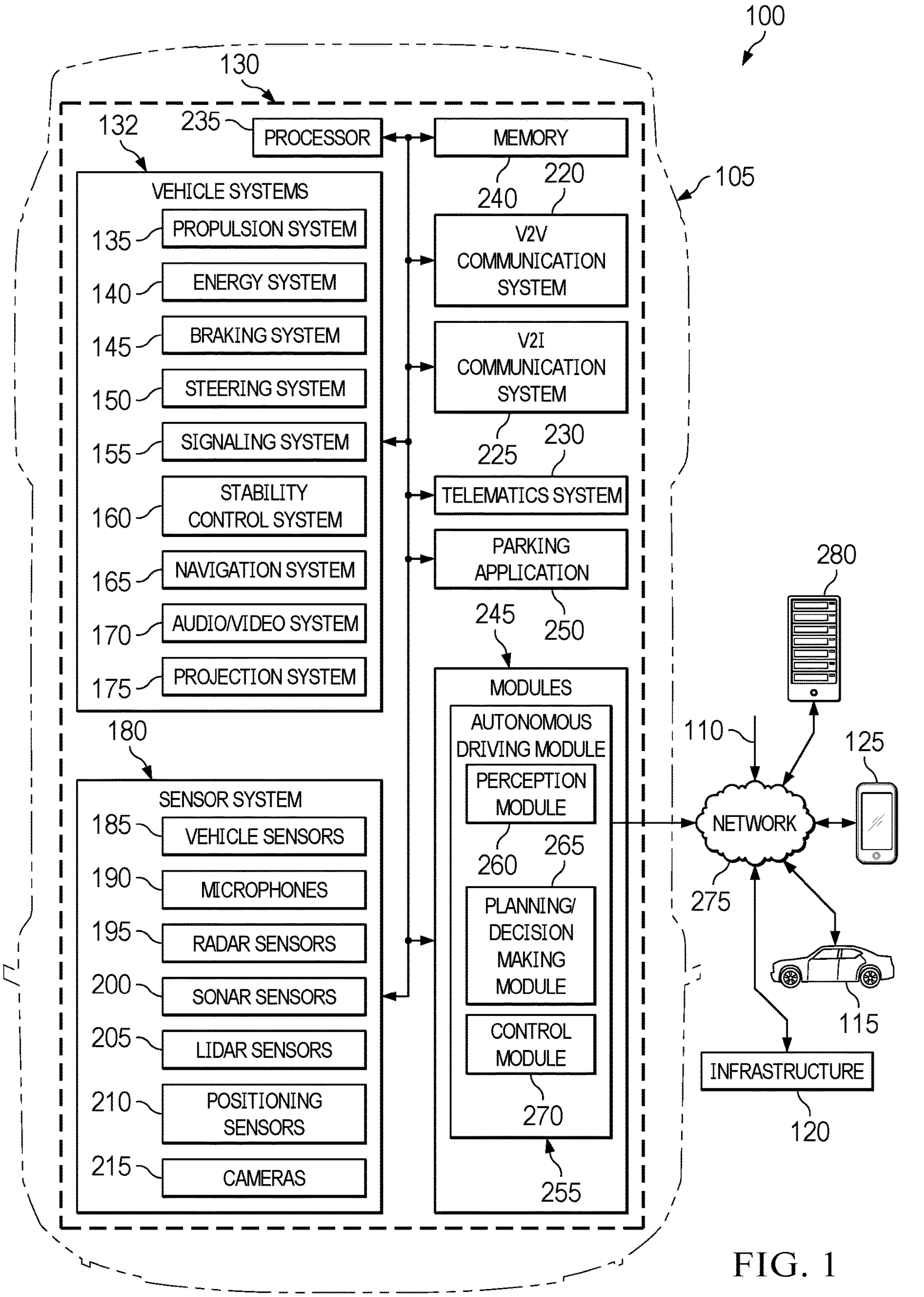
FIG. 1 generally depicts a parking space identification system including a vehicle, one or more additional vehicles, infrastructure, mobile devices, and remote computing devices, according to one or more embodiments of the present disclosure.

FIG. 1 schematically depicts an embodiment of a parking space identification system 100 comprising a vehicle 105 and a communication system 110 enabling the vehicle 105 to communicate either directly or indirectly with additional vehicles 115, infrastructure 120, and mobile devices 125. It is noted that, while the vehicle 105 is depicted as an automobile, the vehicle 105 may be any passenger or non-passenger vehicle.

The vehicle 105 includes a vehicle operations system 130 including various vehicle systems 132, computers, controllers, modules, applications, etc. that cooperate to control and operate the vehicle 105. The vehicle systems 132 may include a propulsion system 135, an energy system 140, a braking system 145, a steering system 150, a signaling system 155, a stability control system 160, a navigation system 165, an audio/video system 170, and a projection system 175, for example, as well as any other systems generally available in vehicles.

The vehicle 105 may include an engine, motor, transmission and other powertrain components housed in its engine compartment or elsewhere in the vehicle 105, as well as other powertrain components, such as wheels. One or more of the wheels may be powered by other powertrain components to drive the vehicle 105. One or more of the wheels may be steered wheels subject to having their steering angles adjusted to adjust the orientation of the vehicle 105.

The propulsion system 135 includes components operable to accelerate the vehicle 105, as well as maintain its speed. The propulsion system 135 may include, for example, the engine, motor, transmission and other powertrain components, as well as certain vehicle controls, such as a cruise control system. The energy system 140 includes components that control or otherwise support the storage and use of energy by the vehicle 105. The energy source employed by the energy system 140 may include, for example, gasoline, natural gas, diesel oil and the like, as well as batteries, fuel cells and the like.

The braking system 145 includes components operable to decelerate the vehicle 105, such as brakes, for example. The steering system 150 includes components operable to adjust the orientation of the vehicle 105 with respect to its longitudinal direction, lateral direction, or both, by adjusting the steering angle of one or more of the wheels. The signaling system 155 includes components operable to communicate driving intentions and other notifications to other vehicles 115 and their users. The signaling system 155 may include, for example, exterior lights such as headlights, a left-turn indicator light, a right-turn indicator light, a brake indicator light, a backup indicator light, taillights and a running light. The stability control system 160 includes components operable to maintain, among other aspects of the stability of the vehicle 105, its proper yaw and pitch, by, for example, actuating brakes and adjusting the power to one or more of the wheels powered by other powertrain components to drive the vehicle 105.

The navigation system 165 establishes routes and directions for the vehicle 105 using, for example, digital maps. The navigation system 165 may itself include digital maps, or the navigation system 165 may connect to remote sources for digital maps. In the absence of the navigation system 165, the vehicle 105 may connect to remote sources for routes and directions.

The audio/video system 170 includes components operable to serve as interfaces between users of the vehicle 105 and the vehicle 105 itself. The audio/video system 170 may include components operable to detect mechanical and verbal inputs received from a user of the vehicle 105 and transform those inputs into corresponding input signals. The audio/video system 170 may also include components operable to transform signals, such as signals representing media, into tactile, visual and sound outputs that may be sensed by a user of the vehicle 105. The audio/video system 170 may include, for example, one or more microphones, one or more speakers, one or more displays and a projector.

The microphones are operable to detect, among other sound waves, verbal inputs from users of the vehicle 105, and transform those verbal inputs into corresponding input signals. The speakers are operable to receive, among other signals, signals representing media from the remainder of the audio/video system 170 and the vehicle 105, and transform those signals into sound outputs that may be heard by users of the vehicle 105. The microphones may be located within the passenger compartment of the vehicle 105 at any location suitable for detecting verbal inputs from a user of the vehicle 105. Similarly, the speakers may be located within the passenger compartment of the vehicle 105 at any location suitable for its sound outputs to be heard by a user of the vehicle 105.

The displays are operable to receive, among other signals, signals representing media from the remainder of the audio/video system 170 and the vehicle 105, and employ any of various display technologies to transform those signals into visual outputs at their surfaces that may be seen by users of the vehicle 105. The projector, similarly to the displays, is operable to receive, among other signals, signals representing media from the remainder of the audio/video system 170 and the vehicle 105, and employ any of various display technologies to transform those signals into visual outputs that may be projected onto surfaces, such as the surface of the windshield, that may be seen by users of the vehicle 105. The displays may also include touchscreens by which the displays are operable to detect the presence and location of mechanical inputs from users of the vehicle 105 at their surfaces, and transform those mechanical inputs into corresponding input signals. The displays may be configured, for example, to receive these mechanical inputs via their touchscreens directly upon the visual outputs at their surfaces. The displays, similarly to the microphones and the speakers, may be located within the passenger compartment of the vehicle 105 or any location suitable for their visual outputs to be seen by users of the vehicle 105, and for receiving mechanical inputs from users of the vehicle 105 via their touch screens.

The vehicle systems 132 also include a projection system 175. The projection system 175 includes a light projection device capable of projecting an image onto a target. In one or more embodiments, the target is a ground surface and, more particularly, a parking space in a parking garage, a parking lot, or on a street/road. The light projection device is also capable of changing the direction and the pattern of the light being projected. As such, the light projection device is capable of projecting different images having varying shapes, designs, patterns, colors, messages, brightness levels, etc.

In one or more embodiments, the light projection device(s) may be positioned relative to one or more areas of the vehicle 105. For example, the light projection device may be located on, or integrated with, side mirrors, front, rear, or side cameras, door handles, bumpers, a trunk, a hood, a grill, etc. of the vehicle 105. In one or more embodiments, the light projection device may be integrated with courtesy light projection devices if the vehicle 105 is equipped with such courtesy light projection devices.

In addition to the vehicle systems 132, the vehicle 105 includes a sensor system 180 including one or more sensors. The term "sensor," as used herein, means a device that measures a physical quantity and converts it into a data signal, which is correlated to the measured value of the physical quantity, such as, for example, an electrical signal, an electromagnetic signal, an optical signal, a mechanical signal, or the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. Additional sensors may also be envisioned, as will be discussed below.

The sensor system 180 and its sensors may be positioned anywhere in or on the vehicle 105, and may include existing sensors of the vehicle 105, such as backup sensors, lane keeping sensors and front sensors, for example. In these and other configurations, the sensor system 180 and its sensors may detect information about the vehicle 105, including without limitation, information about the operation of the vehicle 105, information about its passenger compartment, and information about the environment surrounding the vehicle 105. In the case of information about the environment surrounding the vehicle 105, the sensor system 180 and its sensors may detect information about the environment in front of and behind the vehicle 105 in its longitudinal direction, as well as to the sides of the vehicle 105 in its lateral direction. Information about the environment surrounding the vehicle 105 may include, for example, position and movement information associated with other vehicles 115, position information associated with infrastructure 120, and position information associated with parking spaces.

The sensor system 180 and its sensors may be configured to monitor in real-time, that is, at a level of processing responsiveness at which sensing is sufficiently immediate for a particular process or determination to be made, or that enables a processor to keep up with some external process.

The sensors of the sensor system 180 may include one or more vehicle sensors 185, one or more microphones 190, one or more radar sensors 195, one or more sonar sensors 200, one or more lidar sensors 205, one or more positioning sensors 210 and one or more cameras 215, for example, as well as any other sensors generally available in vehicles.

The vehicle sensors 185 are operable to detect information about the operation of the vehicle 105. The vehicle sensors 185 may include, for example, speedometers, gyroscopes, magnetometers, accelerometers, barometers, thermometers, altimeters, inertial measurement units (IMUs) and controller area network (CAN) sensors. In these and other configurations of the vehicle sensors 185, the detected information about the operation of the vehicle 105 may include, for example, its location and motion, including its speed, acceleration, orientation, rotation, direction and the like, as well as elevation, temperature and the operational statuses of the vehicle systems 132 and their components.

The microphones 190 are operable detect sounds waves and transform those sound waves into corresponding signals. Some microphones 190 may be located to detect sound waves within the passenger compartment of the vehicle 105. These microphones 190 may be the same as, or auxiliary to, the microphones of the audio/video system 170, and may be similarly located within the passenger compartment of the vehicle 105. Other microphones 190 may be located to detect sound waves in the environment surrounding the vehicle 105. These microphones 190 may, accordingly, be at least partially exposed to the environment surrounding the vehicle 105.

The radar sensors 195, the sonar sensors 200, and the lidar sensors 205 are each mounted on the vehicle 105 and positioned to have a fields of view in the environment surrounding the vehicle 105, and are each, generally speaking, operable to detect objects in the environment surrounding the vehicle 105. More specifically, the radar sensors 195, the sonar sensors 200, and the lidar sensors 205 are each operable to scan the environment surrounding the vehicle 105, using radio signals in the case of the radar sensors 195, sound waves in the case of the sonar sensors 200, and laser signals in the case of the lidar sensors 205, and generate signals representing objects, or the lack thereof, in the environment surrounding the vehicle 105. Among other things about the objects, the signals may represent their presence, location and motion, including their speed, acceleration, orientation, rotation, direction and the like, either absolutely or relative to the vehicle 105, or both.

The positioning sensors 210 are operable to identify the position of the vehicle 105. The positioning sensors 210 may implement, in whole or in part, a GPS, a geolocation system or a local positioning system, for example, or any combination of these. For implementing a GPS, the positioning sensors 210 may include GPS transceivers configured to determine a position of the vehicle 105 with respect to the Earth via its latitude and longitude and, optionally, its altitude.

The cameras 215 are operable to detect light or other electromagnetic energy from objects, and transform that electromagnetic energy into corresponding visual data signals representing objects, or the lack thereof. The cameras 215 may be, or include, one or more image sensors configured for capturing light or other electromagnetic energy. These image sensors may be, or include, one or more photodetectors, solid state photodetectors, photodiodes or photomultipliers, or any combination of these. In these and other configurations, the cameras 215 may be any suitable type, including without limitation high resolution, high dynamic range (HDR), infrared (IR) or thermal imaging, or any combination of these.

Some cameras 215 may be located to detect electromagnetic energy within the passenger compartment of the vehicle 105. These cameras 215 may accordingly be located within the passenger compartment of the vehicle 105. Other cameras 215 may be located to detect electromagnetic energy in the environment surrounding the vehicle 105. These cameras 215 may be mounted on the vehicle 105 and positioned to have fields of view individually, or collectively, common to those of the radar sensors 195, the sonar sensors 200 and the lidar sensors 205 in the environment surrounding the vehicle 105, for example.

In addition to the vehicle systems 132 and the sensor system 180, the vehicle operations system 130 may include a vehicle-to-vehicle (V2V) communication system 220, a vehicle-to-infrastructure (V2I) communication system 225, and a telematics system 230.

The V2V communication system 220 is operable to establish wireless communication with like V2V communication systems 220 in other vehicles 115 in the environment surrounding the vehicle 105. The V2V communication system 220 wirelessly transmits information about the vehicle 105, including its state and information detected by the sensor system 180 and its sensors, to other vehicles 115 in the environment surrounding the vehicle 105. Similarly, the V2V communication system 220 wirelessly receives the same or similar information about other vehicles 115 in the environment surrounding the vehicle 105 from their like V2V communication systems 220. The V2V communication system 220 may implement dedicated short-range communication (DSRC), for example, or other kinds of wireless communication.

The V2I communication system 225 is operable to establish wireless communication with like V2I communication systems 225 of the infrastructure 120 in the environment surrounding the vehicle 105. The V2I communication system 225 wirelessly transmits information about the vehicle 105, including its state and information detected by the sensor system 180 and its sensors, to the infrastructure 120 in the environment surrounding the vehicle 105. Similarly, the V2I communication system 225 wirelessly receives the same or similar information about the infrastructure 120 in the environment surrounding the vehicle 105 from the like V2I communication systems 225 of the infrastructure 120. The V2I communication system 225 may implement dedicated short-range communication (DSRC), for example, or other kinds of wireless communication.

The telematics system 230 is operable to establish wireless communication with remote computing devices 280, such as servers. The telematics system 230 wirelessly transmits information about the vehicle 105, including its state and information detected by the sensor system 180 and its sensors, to remote computing devices 280. The telematics system 230 also wirelessly receives a variety of information from remote computing devices 280. The telematics system 230 may implement Internet or cellular communication, for example, to establish wireless communication with remote computing devices 280 over the Internet or a cellular network, as the case may be, or other kinds of wireless communication.

The vehicle 105 also includes one or more processors 235, a memory 240 and one or more modules 245. Together, the processors 235, the memory 240 and the modules 245 constitute a computing device to which the vehicle systems 132, the sensor system 180, the V2V communication system 220, the V2I communication system 225, the telematics system 230, and any other systems are communicatively connected. This computing device, including the processors 235, the memory 240, and the modules 245, may be configured as parts of a central control system for the vehicle 105, such as a central electronic control unit (ECU).

In one or more embodiments, the computing device may be dedicated to an autonomous operation system via which the vehicle 105 is subject to autonomous operation. Under the autonomous operation system, the vehicle 105 may be semi-autonomous or highly automated, for example.

The processors 235 may be any components configured to execute any of the processes described herein or any form of instructions to carry out such processes or cause such processes to be performed. The processors 235 may be implemented with one or more general-purpose or special-purpose processors. Examples of suitable processors 235 include microprocessors, microcontrollers, digital signal processors or other forms of circuitry that can execute software. Other examples of suitable processors 235 include without limitation central processing units (CPUs), array processors, vector processors, digital signal processors (DSPs), field-programmable gate arrays (FPGAs), programmable logic arrays (PLAs), application specific integrated circuits (ASICs), programmable logic circuitry or controllers. The processors 235 can include at least one hardware circuit (e.g., an integrated circuit) configured to carry out instructions contained in program code. In arrangements where there are multiple processors 235, the processors 235 can work independently from each other or in combination with one another.

The memory 240 is a non-transitory computer readable medium. The memory 240 may include volatile or non-volatile memory, or both. Examples of suitable memory 240 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives or any other suitable storage medium, or any combination of these. The memory 240 includes stored instructions in program code. Such instructions can be executed by the processors 235 or the modules 245. The memory 240 may be part of the processors 235 or the modules 245, or may be communicatively connected the processors 235 or the modules 245.

The vehicle 105 also includes a plurality of applications. The plurality of applications may be stored in the memory 240 and executed by the processors 235. The plurality of applications includes a parking application 250. The parking application 250 may be displayed via one or more of the displays of the audio/video system 170. In one or more embodiments, the parking application 250 may be adapted to receive one or more inputs from the user via the display or another element of the audio/video system 170, such as a microphone, for example. In some embodiments, the one or more inputs may be received via user interaction with the touchscreen of the display. In some embodiments, the one or more inputs may be received as audio inputs received by microphones of the audio/video system 170 when the user speaks or gives voice commands. The microphone can be any sensor that transforms mechanical vibrations into a data signal. As will be described in more detail below, the parking application 250 receives information associated with open parking spaces in a parking garage or parking lot and enables the user to identify open parking spaces or to reserve a parking space ahead of time.

The modules 245 are employable to perform various tasks in the vehicle 105. Generally speaking, the modules 245 include instructions that may be executed by the processors 235. The modules 245 can be implemented as computer readable program code that, when executed by the processors 235, execute one or more of the processes described herein. Such computer readable program code can be stored on the memory 240. The modules 245 may be part of the processors 235, or may be communicatively connected with the processors 235.

The modules 245 may include, for example, an autonomous driving module 255. The autonomous driving module 255 generates driving plans for maneuvering the vehicle 105 on roadways based on the information about the vehicle 105, including information detected by the sensor system 180 and its sensors, and executes the driving plans by operating the appropriate vehicle systems 132. In this so-called autonomous operation of the vehicle 105, its human driver will have ceded control over one or more primary control functions in favor of autonomous operation. These primary control functions may include propulsion, or throttle, braking or steering, for example, or any combination of these. The vehicle systems 132 operated by the autonomous driving module 255 include those associated with the primary control functions over which the human driver has ceded control.

Among other sub-modules, the autonomous driving module 255 may include a perception module 260, a planning/decision making module 265, and a control module 270.

The perception module 260 gathers and evaluates information about the vehicle 105, including information detected by the sensor system 180 and its sensors and information about other vehicles 115 and infrastructure 120 communicated from the V2V communication system 220 and the V2I communication system 225, as well as information sourced from digital maps. In the case of information about the environment surrounding the vehicle 105, the perception module 260 may, as part of its evaluation, identify objects in the environment surrounding the vehicle 105, including their properties. These properties may include, among other things about the objects, their presence, location and motion, including their speed, acceleration, orientation, rotation, direction and the like, either absolutely or relative to the vehicle, or both. In cases where these objects are other vehicles 115, the perception module 260 may additionally, or alternatively, identify these things, as well as the states of the other vehicles 115, from the information about the other vehicles 115 communicated from the V2V communication system 220.

The perception module 260 may discriminate between different objects and individually track different objects over time. Either on initial detection or after tracking them over time, the perception module 260 may classify objects to account not only for roadways, features of roadways, such as lane markings, and obstacles on or around roadways, such as other vehicles 115, but also for surrounding ground, pedestrians, bicycles, construction equipment, road signs, buildings, trees and foliage, for example.

Either alone or in combination with its identification and classification of objects in the environment surrounding the vehicle 105, the perception module 260 may identify the location of the vehicle 105 in the environment surrounding the vehicle 105. For example, the perception module 260 may implement localization techniques that match identified objects in the environment surrounding the vehicle 105, as well as their properties, to those reflected in digital maps as part of an overall 3D road network. The autonomous driving module 255 may itself include digital maps, for example, or the perception module 260 may connect to the navigation system 165 or to remote sources for digital maps. Implementing these or other localization techniques, the perception module 260 may identify, among other aspects about the location of the vehicle 105 in the environment surrounding the vehicle 105, the location of the vehicle 105 on roadways or in parking garages or parking lots.

The planning/decision making module 265, based on the evaluation of the information about the vehicle 105 by the perception module 260, generates driving plans for maneuvering the vehicle 105 on roadways. The driving plans may be, more specifically, for performing driving maneuvers. The driving plans may be part of, or augment, larger but otherwise analogous and similarly generated driving plans for maneuvering the vehicle 105 on roadways.

The driving plans may account for any objects in the environment surrounding the vehicle 105 as well as their properties, for example. Particularly in the case of obstacles on or around roadways, the driving plans may account for their predicted future maneuvering along the roadways. Accordingly, as part of its generation of driving plans, the planning/decision making module 265 may predict the future maneuvering of obstacles along roadways. The predicted future maneuvering of an obstacle along a roadway may be based on its presence, location and motion, as identified by the perception module 260, as well as how the perception module 260 classifies the obstacle and tracks it over time.

The driving plans themselves, as well as underlying predictions of the future maneuvering of obstacles along roadways, may also account for different lane positions and traffic rules, such as speed limits, priorities at intersections and roundabouts, stop line positions and the like. The autonomous driving module 255 may itself include digital maps reflecting these lane positions and traffic rules as part of an overall 3D road network, for example, or the planning/decision making module 265 may connect to the navigation system 165 or to remote sources for digital maps.

The control module 270 operates the appropriate vehicle systems 132 to execute the driving plans generated by the planning/decision making module 265. The control module 270 may send control signals to the vehicle systems 132 or may directly send control signals to actuators that operate their components, or both.

In one or more embodiments, the telematics system 230 comprises network interface hardware for communicatively coupling the vehicle 105 with a network 275. Network interface hardware can be any device capable of transmitting and/or receiving data via the network 275. Accordingly, network interface hardware can include an antenna and/or other communication transceiver for sending and/or receiving any wired or wireless communication. For example, network interface hardware may include an antenna, a modem, LAN port, wireless fidelity (Wi-Fi) card, WiMax card, mobile communications hardware, near-field communication hardware, satellite communication hardware and/or any wired or wireless hardware for communicating with other networks and/or devices. Depending upon the implementation, the network interface hardware may form a part of the electronic control unit or other unit of the vehicle 105.

The network 275 may be utilized to communicatively couple the vehicle 105, one or more remote computing devices 280, one or more mobile devices 125, one or more additional vehicles 115, or infrastructure 120. In addition, each of the vehicle 105, the one or more remote computing devices 280, the one or more mobile devices 125, the one or more additional vehicles 115, and the infrastructure 120 can be communicatively coupled to one another directly or indirectly via the network 275. For example, one or more devices communicatively coupled to the network 275 can operate as an intermediary to transmit data between any of the other devices. Accordingly, the network 275 can facilitate a distributed computing arrangement amongst the vehicle 105, the one or more remote computing devices 280, the one or more mobile devices 125, the one or more additional vehicles 115, and the infrastructure 120. Specifically, any of the devices communicatively coupled to network 275 can share cloud resources such that each communicatively coupled device can perform any portion of the logic described herein.

The computing devices 280 can comprise one or more processors and one or more memories. The one or more processors can execute logic to provide resources to vehicle 105 and/or any other device communicatively coupled to network 275. For example, the one or more remote computing devices 280 can provide supplementary processing power, via relatively high-powered processors, to the vehicle 105. In some implementations, the one or more remote computing devices 280 may provide supplementary data storage to the vehicle 105. Moreover, one or more remote computing devices 280 can provide platforms such as, for example, a social networking service, news service, weather service, traffic service, map service (e.g., restaurant data, fuel station data, service station data), parking applications 250, and any other service capable of being exchanged between a server and a client.

The one or more mobile devices 125 may be communicatively coupled to the vehicle 105 via the network 275. In certain embodiments of the present disclosure, the mobile device 125 may be a mobile phone of a third party or an occupant of the vehicle 105 or the additional vehicle 115 used to interface with, for example, the parking application 250. Each of the one or more mobile devices 125 can comprise one or more processors and one or more memories. Accordingly, one or more mobile devices 125 can operate as a client and/or a server with respect to the vehicle 105. The one or more mobile devices 125 may be configured as a cellular or mobile telephone, with functionality for wireless data communications. Thus, while the mobile device 125 is depicted herein as a mobile telephone, it should be understood that the mobile device 125 can be any mobile communications device that can exchange data via a mobile telecommunication service such as, for example, a personal digital assistant, a smart phone, or a laptop computer with a wireless communication peripheral. Furthermore, it is noted that one or more mobile devices 125 may further be configured to communicate data via one or more cellular networks, satellite networks and/or computer networks. In one embodiment, network interface hardware of the vehicle 105 can be communicatively coupled to the mobile devices 125 via a personal area network such that the mobile devices 125 communicatively couple the network interface hardware to the network 275.

The one or more additional vehicles 115 are communicatively coupled to the vehicle 105 via a V2V communications link of the network 275. The additional vehicle(s) 115 are also equipped with components similar to those described above with respect to the vehicle 105, thus enabling the vehicle 105 to receive and transmit information associated with the additional vehicles 115 or the environment surrounding the additional vehicles 115.

The infrastructure 120 is communicatively coupled to the vehicle 105 via a V2I communications link of network 275. The infrastructure 120 is also equipped with sensor systems similar to those described above with respect to the vehicle 105, thus enabling the infrastructure 120 to receive and transmit information associated with the infrastructure 120 or the environment surrounding the infrastructure 120. The infrastructure 120 can include light posts 120A, camera posts, buildings, walls, fences, gates, doors, pillars, and other structures capable of being equipped with sensor systems 180 and projections systems 175, and capable of being communicatively coupled to the network 275.

Depending upon the implementation, the network 275 may include one or more, V2V networks, V2I networks, cellular networks, satellite networks and/or computer networks such as, for example, a wide area network, a local area network, personal area network, a global positioning system and combinations thereof. Suitable local area networks may include wired Ethernet and/or wireless technologies such as, for example, Wi-Fi or near-field communication protocols. Suitable personal area networks may include wireless technologies such as, for example, IrDA, Bluetooth, Wireless USB, Z-Wave, ZigBee, and the like. Alternatively or additionally, suitable personal area networks may include wired computer buses such as, for example, USB and Fire Wire. Suitable cellular networks include, but are not limited to, technologies such as LTE, WiMAX, UMTS, CDMA, and GSM. Thus, any components of the vehicle 105 can utilize the network 275 to transmit signals over the Internet.

Referring to FIGS. 2A-4B, an example embodiment of the parking space identification system 100, and its operation, is provided. The parking space identification system 100 includes the vehicle 105, the network 275, the additional vehicles 115, the infrastructure 120, the mobile devices 125, and the remote computing devices 280. In one or more embodiments, the parking space identification system 100 may include any one or more of these elements. Together, the various elements of the parking space identification system 100 identify open parking spaces 295 in a parking garage 285 (or parking lot), enable an open parking space 295 to be selected and reserved by the vehicle 105 in advance of arrival at the parking garage 285, and/or identify and highlight the open parking spaces 295 or the reserved parking space 305 for the vehicle 105 as it navigates the parking garage 285. In one or more embodiments, the parking space identification system 100 may enable any one or more of these elements to be performed.

The parking space identification system 100 also includes the parking application 250, which is stored in the memory 240 of the vehicle 105 and is executed by the one or more processors 235 of the vehicle 105. In one or more embodiments, the parking application 250 may also be stored and executed by the additional vehicles 115, the infrastructure 120, the mobile devices 125, and/or the remote computing devices 280.

The parking application 250 enables the identification and reservation of open parking spaces 295 in the parking garage 285, which facilitates a more efficient parking experience. In operation, the parking application 250 provides instructions that enable the additional vehicles 115 and the infrastructure 120 in the parking garage 285 to use their respective sensor systems 180 to identify the open parking spaces 295 in the parking garage 285 and generate open parking space information (or data). The open parking space information is communicated via the parking application 250 and the network 275 to the server of the remote computing device 280. The open parking space information can be accessed by the parking application 250 on client devices, such as the vehicle 105 or the mobile devices 125, to permit the client devices, or users of the client devices, to select and reserve an open parking space 295 in advance of arriving at the parking garage 285.

In one or more embodiments, the instructions for enabling the identification of open parking spaces 295 and the instructions for enabling the reservation of an open parking space 295 may be separated into two separate applications.

Figure 2A:
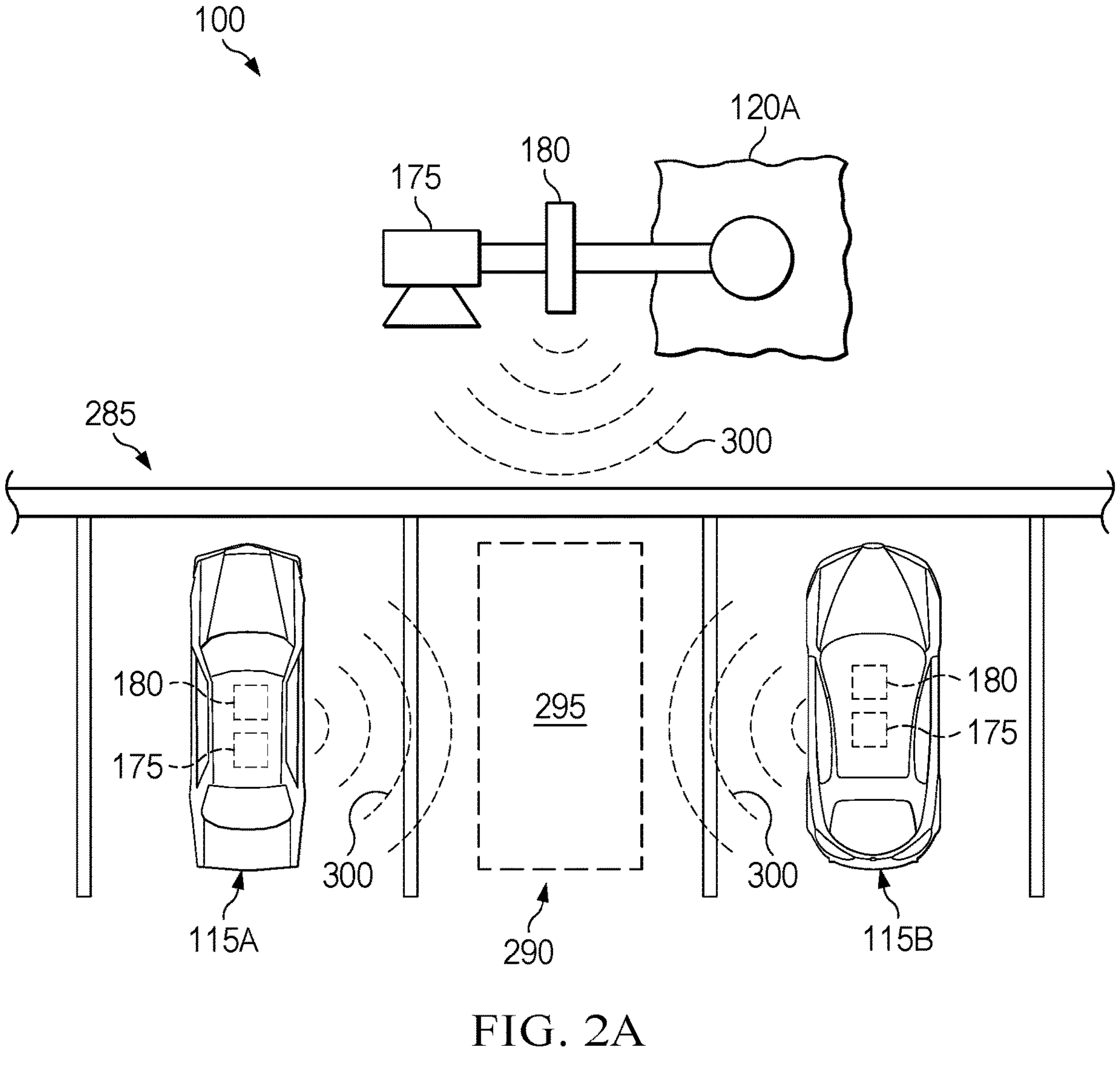
FIGS. 2A and 2B illustrate sensor systems of the one or more additional vehicles and of the infrastructure detecting an open parking space, according to one or more embodiments of the present disclosure.
Figure 2B:
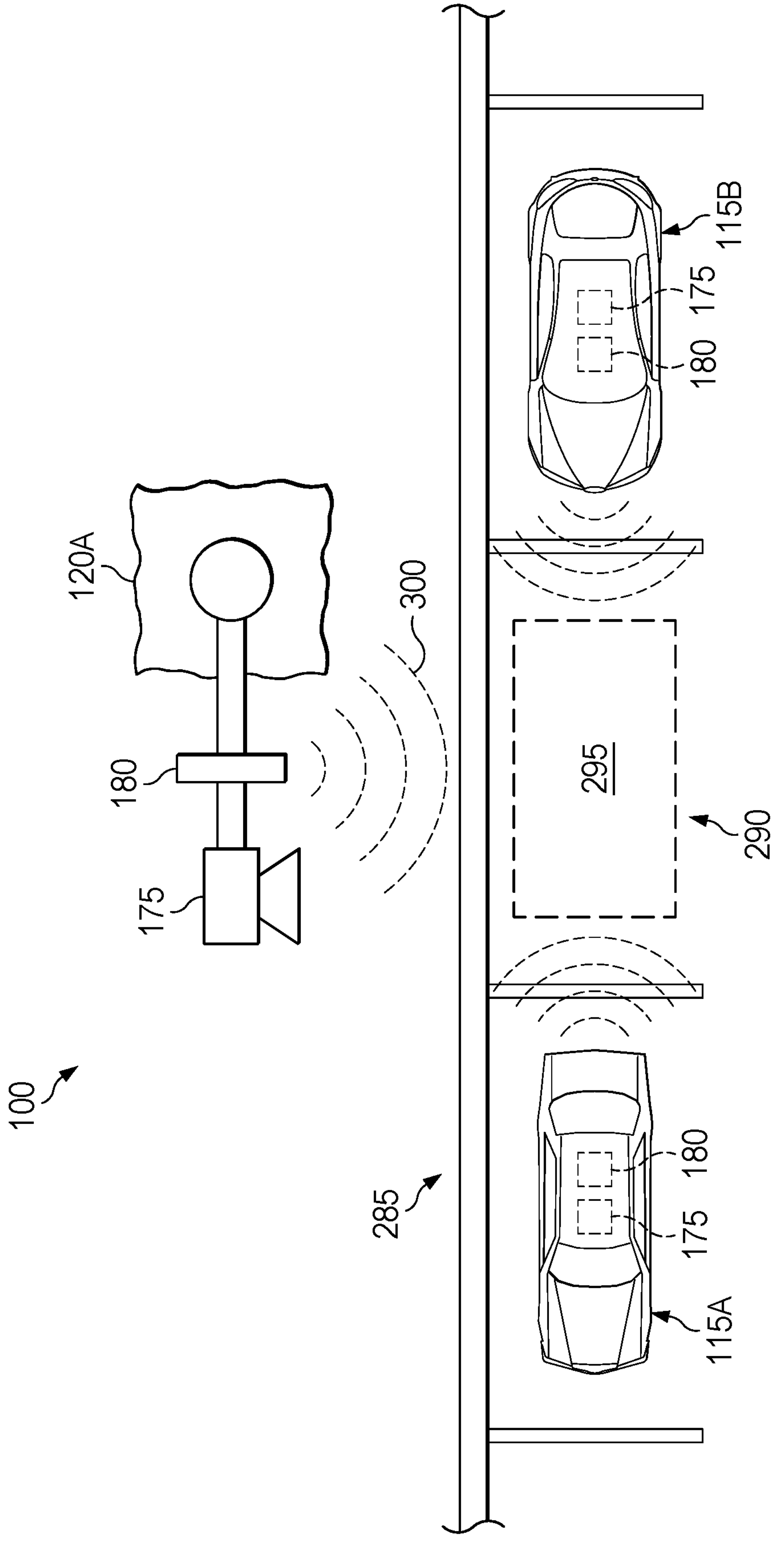

Referring specifically to FIGS. 2A and 2B, the parking space identification system 100 is shown identifying an open parking space 295 in a parking garage 285. In some embodiments, as shown in FIG. 2A, the parking spaces 290 are organized side-to-side, which is the most common organization of parking spaces 290 in a parking garage 285. In other embodiments, as shown in FIG. 2B, the parking spaces 290 are organized front-to-back (or in a parallel-parking arrangement), which is common for street parking or narrow parking lots.

As stated above, the additional vehicles 115 and the infrastructure 120 can be equipped with elements similar to any one or more of the elements described above with respect to the vehicle 105, including the sensor system 180, the projection system 175, the parking application 250, the V2V communication system 220, the V2I communication system 225, and the CPU. The additional vehicles 115 and the infrastructure 120 use these elements to identify and communicate open parking space information via the network 275.

With continued reference to FIGS. 2A and 2B, the additional vehicles 115 and the infrastructure 120 located in or around the parking garage 285 use one or more sensors or cameras of their respective sensor systems 180 to scan their surrounding environments. By sending out signals 300 to scan their surrounding environments, the respective sensor systems 180 of the additional vehicles 115 and of the infrastructure 120 can detect the presence of vehicles in the parking spaces 290 adjacent, or nearby to, the additional vehicles 115 and the infrastructure 120 and can identify open parking spaces 295 in the absence of vehicles in the adjacent parking spaces 290. Open parking space information is then generated based on the determinations made from the signals 300. The open parking space information is stored in the parking application 250 and communicated over the network 275 to the remote computing devices 280 and to the client devices, including the mobile devices 125 and the vehicle 105.

In one or more embodiments, the sensor system 180 of the infrastructure 120 may be elevated above the ground surface of the parking garage 285 and thus may be directed substantially downward in order to scan its surrounding environment for open parking spaces 295. The sensor system 180 of the infrastructure 120 may also scan 360 degrees and at a predetermined radial range or at a threshold radial range. The sensor systems 180 of the additional vehicles 115 also may scan 360 degrees about each additional vehicle 115 and at a predetermined radial range or at a threshold radial range.

In one or more embodiments, the sensor systems 180 or parking application 250 may be trained to recognize parking space lines or other parking garage indicators in order to recognize potential parking spaces. In other embodiments, the parking application 250 may be preprogrammed with the layouts of one or more parking garages 285.

In the embodiments shown in FIGS. 2A and 2B, a first additional vehicle 115A, a second additional vehicle 115B, and a light post 120A are all located adjacent to a parking space 290. As further shown, each of the sensor systems 180 associated with the first additional vehicle 115A, the second additional vehicle 115B, and the light post 120A send out signals 300 to scan their surrounding environments to determine whether the adjacent parking space 290 is an open parking space 295 or an occupied parking space. As shown, each respective sensor system 180 is able to detect that the parking space 290 is unoccupied and thus identifies the adjacent parking space 290 as an open parking space 295. The respective sensor systems 180 then generate open parking space information including the existence and location of open parking spaces 295 in the parking garage 285. The open parking space information is stored in the parking application 250 and communicated via the network 275.

In FIG. 2A, the open parking space 295 is detected between adjacent sides of the first additional vehicle 115A and the second additional vehicle 115B. In FIG. 2B, the open parking space 295 is detected between adjacent front and rear ends of the first additional vehicle 115A and the second additional vehicle 115B.

In the embodiment shown, the first and second additional vehicles 115A, 115B and the infrastructure 120A are detecting the same open parking space 295. In such embodiments, the multiple additional vehicles 115A, 115B and the infrastructure 120A are able to communicate with each other via V2V and V2I communication systems 220,225 and via the network 275 to confirm the existence of the open parking space 295 and to ensure that the open parking space information generated for the open parking space 295 is not duplicated by the multiple sensor systems 180.

Although the accuracy of the determination of an open parking space 295 can be improved by the cooperation of multiple sensors systems 180, such as from multiple additional vehicles 115 and infrastructure 120, the open parking space 295 can still be identified by a single sensor system 180. In one or more embodiments, only one additional vehicle 115 may be adjacent the parking space 290. In such embodiments, the sensor system 180 of the additional vehicle 115 alone can identify the open parking space 295. In one or more embodiments, only the infrastructure 120 may be adjacent the parking space 295. In such embodiments, the sensor system 180 of the infrastructure 120 alone can identify the open parking space 295.

In one or more other embodiments, there may be a plurality of open parking spaces 295 adjacent each other and spaced apart from the additional vehicles 115 and the infrastructure 120. In such embodiments, depending on the range of the sensor systems 180 of the additional vehicles 115 and of the infrastructure 120, each additional vehicle 115 or the infrastructure 120 can detect one or more of the plurality of open parking spaces 295. In other words, the sensor systems 180 of the additional vehicles 115 and of the infrastructure 120 are each able to identify more than one open parking space 295 and each sensor system 180 is not limited to identifying only the open parking space 295 that is immediately adjacent to the additional vehicle 115 or infrastructure 120.

In one or more embodiments, the sensor systems 180 of the additional vehicles 115 or of the infrastructure 120 can be programmed to scan for open parking spaces 295 as frequently or as infrequently as needed based on the requirements of the application. In one or more embodiments, to improve energy efficiency and prevent draining or depleting vehicle batteries, the sensor systems 180 of the additional vehicles 115 may scan for open parking spaces 295 one time after the respective additional vehicle 115 has parked in the parking garage 285. If each additional vehicle 115 scans its environment after parking, the open parking space information can be continuously updated to ensure its accuracy without requiring frequent scanning of the environment. Similarly, in order to reduce energy consumption, the infrastructure 120 can scan its environment in the parking garage 285 at predetermined intervals or only when the infrastructure 120 detects movement of vehicles in the parking garage 285. In one or more embodiments, the additional vehicles 115 may also scan or re-scan their environments when they detect movement of other vehicles in the parking garage 285.

Once the open parking space information has been stored in the parking application 250 and communicated to the server of the remote computing device 280, the parking application 250 can be accessed by the vehicle 105, by the user of the vehicle 105, or by the user of the mobile device 125 to reserve the open parking space 295 in advance of arriving at the parking garage 285. In one or more embodiments, the user desiring to reserve the open parking space 295 may register with the server by accessing a web portal associated with the parking application 250. For example, a user/owner/driver/occupant of the vehicle 105 desiring to reserve the open parking space 295 may access the web portal by using one or more elements of the audio/video system 170 of the vehicle 105 or by using the mobile device 125. The user may create a user account that provides access to data on the web portal that is accessed from the network 275. The user may enter a username and provide a password to authenticate the user on the web portal. The user may also provide a variety of personal identifying information and/or vehicle identifying information including, but not limited to, the user's name, home location, vehicle make, vehicle model, vehicle model year, vehicle configuration, vehicle identification number, and or other information.

In some implementations, the web portal may access a database, which may form a part of the remote computing device 280, that is available through the network 275 that includes a variety of vehicle data, parking garage data, and open parking space information.

Once the user is authenticated on the web portal associated with the parking application 250, the user may access the open parking space information associated with the parking garage 285 and reserve the open parking space 295 for the user and the vehicle 105. After the open parking space 295 is reserved in the parking application 250, the open parking space 295 becomes a reserved parking space 305 associated with the user and the vehicle 105. The vehicle 105 associated with the reserved parking space 305 may be referred to as a designated vehicle 310.

In one or more embodiments, the reservation of the open parking space 295 on behalf of the user and the vehicle 105 can occur automatically once the user enters a destination into the navigation system 165 or into the autonomous driving module 255. Once the destination is entered, the vehicle 105 can automatically access the parking application 250, search for parking garage information and open parking space information associated with the destination, and reserve a parking space prior to the arrival of the vehicle 105 at the destination. The user then drives to the destination and locates the reserved parking space 305 associated with the vehicle 105. Where the operation of the vehicle 105 is fully autonomous, the autonomous driving module 255 will navigate the vehicle 105 to the destination and park the vehicle 105 in the reserved parking space 305 associated with the vehicle 105.

Figure 3A:
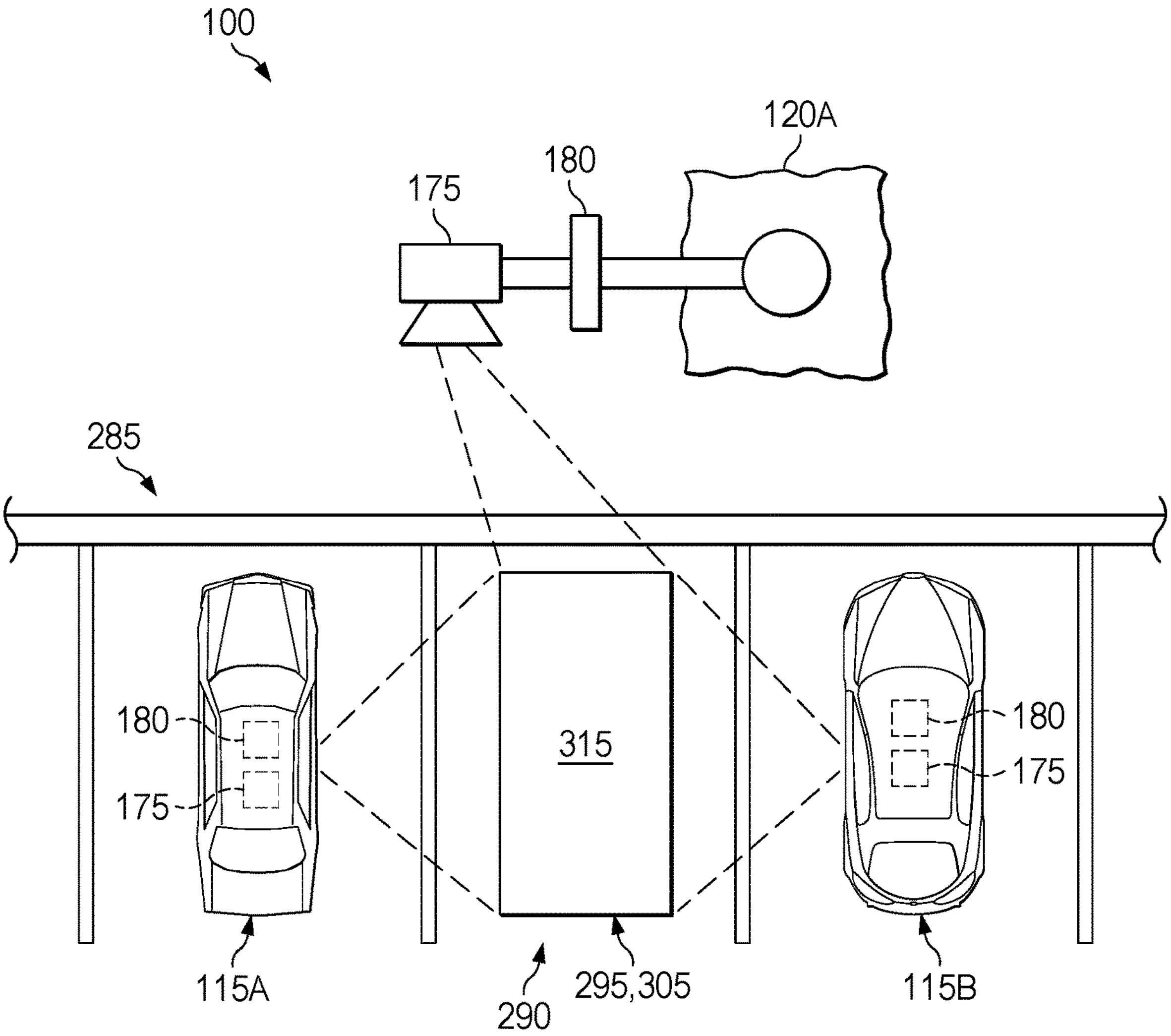
FIGS. 3A and 3B illustrate projection systems of the one or more additional vehicles and of the infrastructure projecting a first image onto the open parking space, according to one or more embodiments of the present disclosure.
Figure 3B:
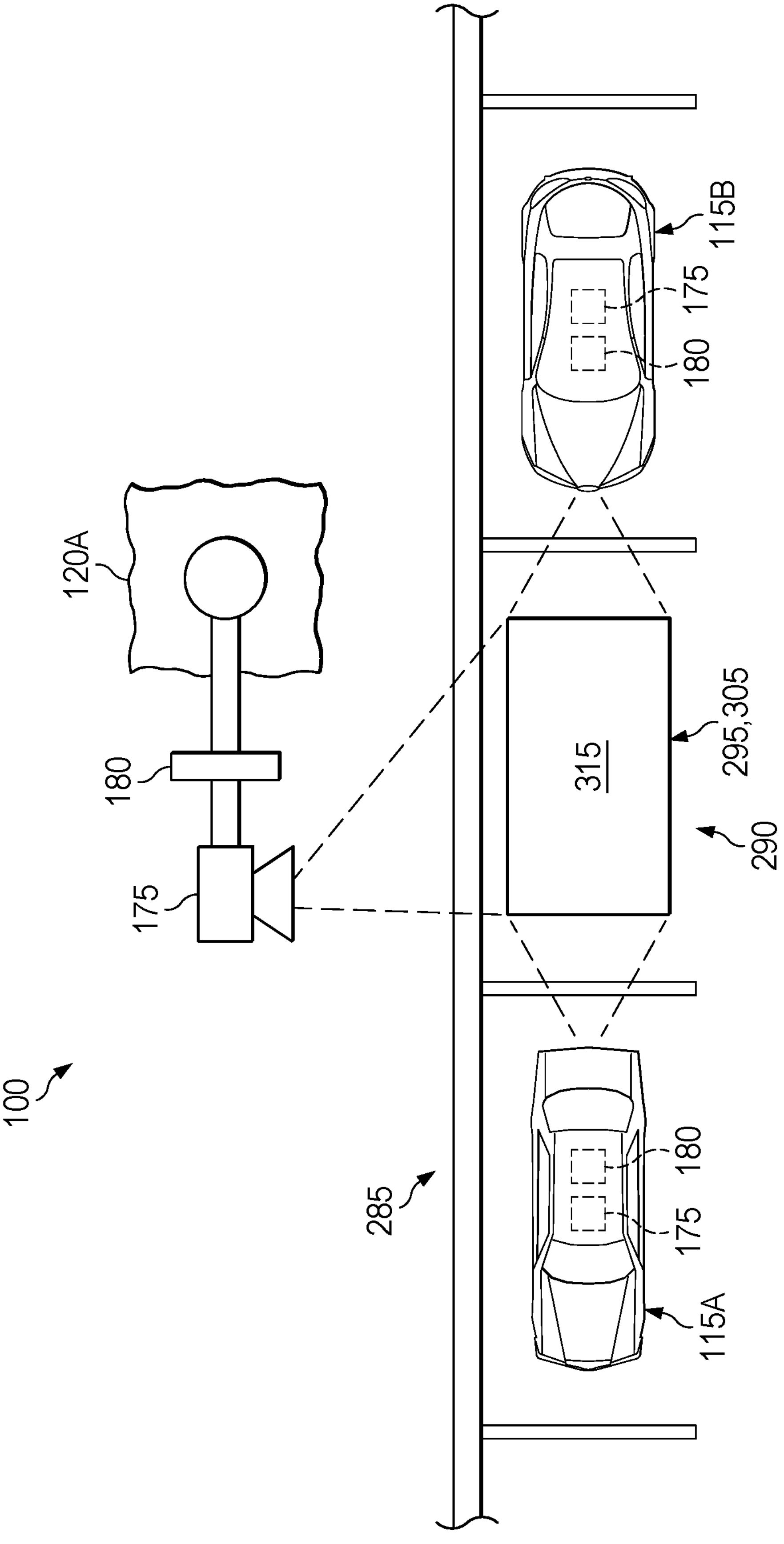

Referring to FIGS. 3A and 3B, once the respective sensor systems 180 of the first and second additional vehicles 115A,115B and of the infrastructure 120A have determined the existence and location of the open parking space 295, respective projection systems 175 of the first and second additional vehicles 115A,115B and of the infrastructure 120A project a first image 315 onto the reserved parking space 305. In FIG. 3A, the first image 315 is projected onto the reserved parking space 305 that is located between adjacent left and right sides of the first additional vehicle 115A and the second additional vehicle 115B. In FIG. 3B, the first image 315 is projected onto the reserved parking space 305 that is located between adjacent front and rear ends of the first additional vehicle 115A and the second additional vehicle 115B.

In the embodiment shown, the respective projection systems 175 of the first and second additional vehicles 115A, 115B and of the infrastructure 120A are each projecting the first image 315 onto the reserved parking space 305. In such embodiments, the first and second additional vehicles 115A, 115B and the infrastructure 120A can communicate with each other via the V2V and V2I communication systems 220,225 and via the network 275 to confirm what image should be projected onto the reserved parking space 305 and to confirm that the multiple projections align so as to be discernable and understandable when viewed on the reserved parking space 305.

Although the accuracy and clarity of the projection onto the reserved parking space 305 can be improved by the cooperation of multiple projection systems 175, the first image 315 can be projected onto the reserved parking space 305 using only one projection system 175, which may be associated with one of the additional vehicles 115 or the infrastructure 120. In one or more embodiments, only one additional vehicle 115 may be adjacent the parking space 290. In such embodiments, the projection system 175 of the additional vehicle 115 alone can project the first image 315 onto the reserved parking space 305. In one or more embodiments, only the infrastructure 120 may be adjacent the parking space 290. In such embodiments, the projection system 175 of the infrastructure 120 alone can project the first image 315 onto the reserved parking space 305.

In one or more other embodiments, there may be a plurality of open parking spaces 295 adjacent each other and spaced apart from the additional vehicles 115 and the infrastructure 120. In such embodiments, depending on the range of the light projection device of the projection system 175 of the additional vehicles 115 and of the infrastructure 120, each additional vehicle 115 or infrastructure 120 can project the first image 315, or different images, onto any one or more of the plurality of open parking spaces 295. In other words, the additional vehicles 115 and the infrastructure 120 are not limited to projecting onto only one open parking space 295 or only onto the open parking space 295 that is immediately adjacent to the additional vehicle 115 or infrastructure 120.

In one or more embodiments, the projection systems 175 of the additional vehicles 115 or of the infrastructure 120 may include one or more light projection devices to enable multiple projections from a single additional vehicle 115 or infrastructure 120. In one or more embodiments, the one or more light projection devices may be positioned about the additional vehicle 115 such that the one or more projections can be made left, right, forward, or rearward with respect to the additional vehicle 115. Thus, no matter where the reserved parking space 305 is located with respect to the additional vehicle 115, the additional vehicle 115 will be able to project the first image 315 onto the reserved parking space 305.

As discussed above, the light projection device is capable of changing the direction and the pattern of the light being projected. The light projection device is capable of projecting different images having varying shapes, designs, patterns, colors, messages, brightness levels, etc. Thus, the first image 315 can be customized to meet the requirements or preferences of the application.

In the embodiment shown, the first image 315 indicates that the open parking space 295 has been reserved and is no longer an open parking space 295, but rather is a reserved parking space 305. Therefore, in such embodiments, the first image 315 may project, for example, a red color indicating that the reserved parking space 305 is not available, a text message reading "RESERVED" or "NO PARKING", or any combination of colors and text desired to convey a particular message.

In one or more embodiments, the open parking space 295 may not yet be reserved. In such embodiments, the first image 315 may indicate that the open parking space 295 is in fact an open parking space 295 and is available for parking. Therefore, in such embodiments, the first image 315 may project, for example, a green color indicating that the open parking space 295 is available, a text message reading "OPEN", or any combination of colors and text to convey that the open parking space 295 is an open parking space 295 and is available for parking.

In one or more embodiments, the first image 315 may be constantly projected onto the reserved parking space 305 such that it is always visible. In one or more other embodiments, to conserve energy and prevent draining the batteries of the additional vehicles 115, the first image 315 may be projected onto the reserved parking space 305 only when the sensor systems 180 of the additional vehicles 115 and of the infrastructure 120 detect vehicle movement in close proximity to the parking space 290.

Figure 4A:
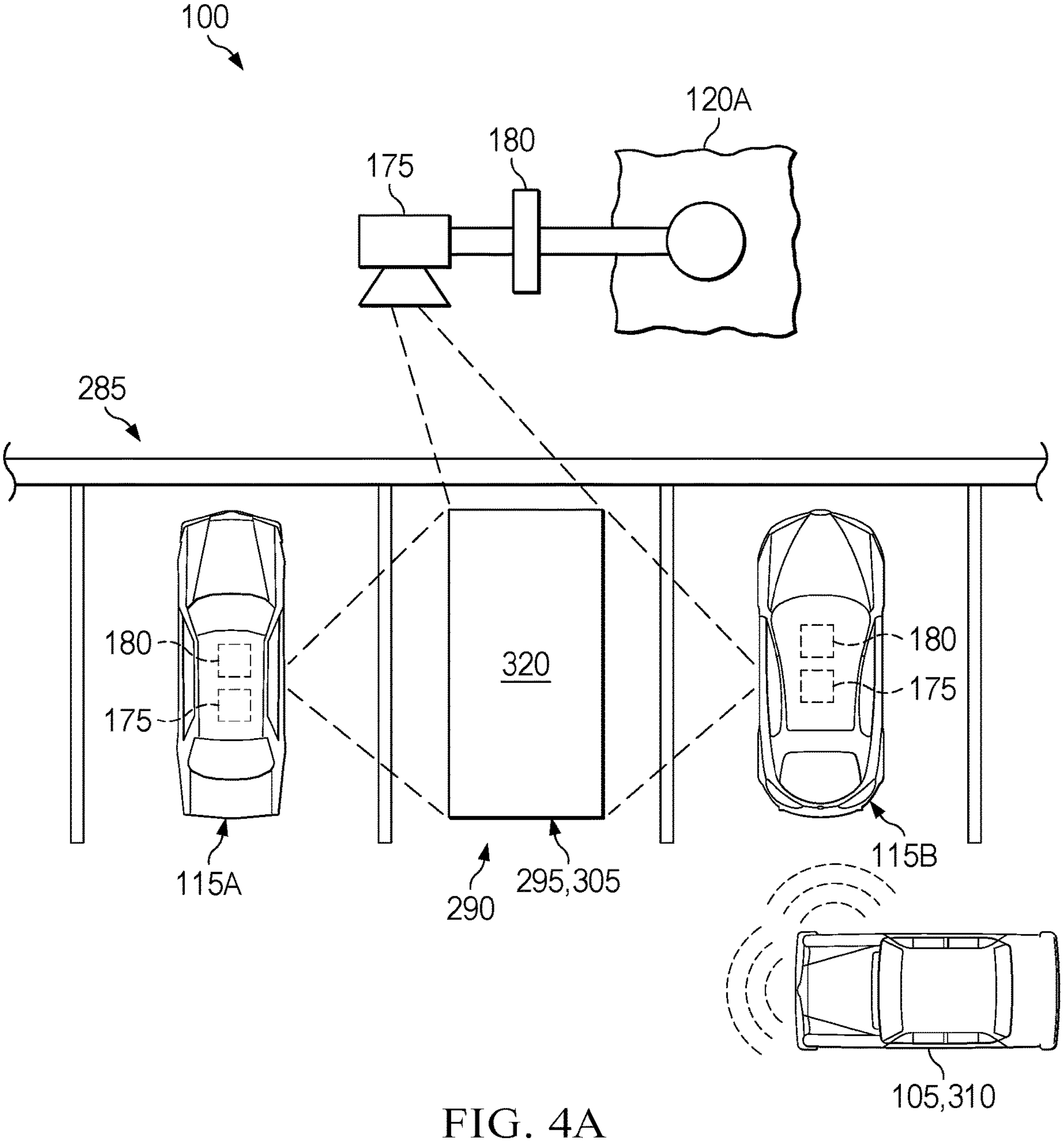
FIGS. 4A and 4B illustrate the projection systems projecting a second image onto the open parking space in response to the detection of the vehicle in close proximity to the open parking space, according to one or more embodiments of the present disclosure.
Figure 4B:
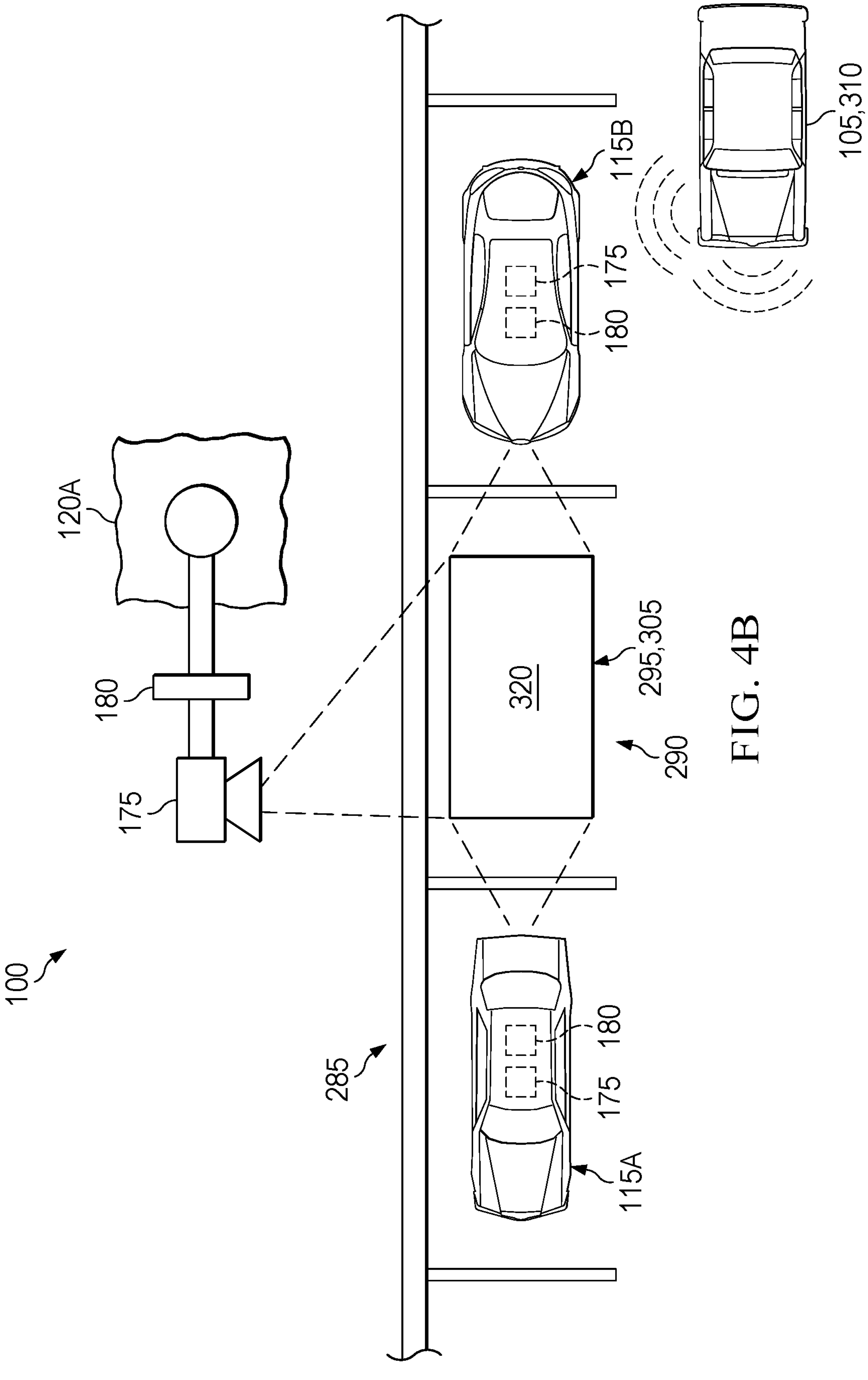

Referring to FIGS. 4A and 4B, a vehicle 105, is shown navigating the parking garage 285 and approaching the parking space 290. The vehicle movement is detected by the sensor systems 180 of the additional vehicles 115A,115B and of the infrastructure 120A adjacent the parking space 290. As the vehicle 105 navigating the parking garage 285 approaches the first and second additional vehicles 115A, 115B and the infrastructure 120A, the vehicle 105 communicates with the first and second additional vehicles 115A, 115B and the infrastructure 120A via the V2V and V2I communication systems 220,225. Using the V2V and V2I communication systems 220,225 and using the parking application 250, the first and second additional vehicles 115A,115B and the infrastructure 120B are able to determine whether or not the approaching vehicle 105 is the designated vehicle 310 associated with the reserved parking space 305. If the approaching vehicle 105 is determined and authenticated to be the designated vehicle 310 associated with the reserved parking space 305, the first image 315 being projected onto the reserved parking space 305 is replaced with a second image 320.

In the embodiment shown, the first image 315 indicates that that the reserved parking space 305 is reserved and that approaching vehicles should not park in the reserved parking space 305. After determining that the approaching vehicle 105 is the designated vehicle 310 associated with the reserved parking space 305, the second image 320 is projected onto the reserved parking space 305 and indicates to the designated vehicle 310 that it is permitted to park in the reserved parking space 305. Therefore, the second image 320 may depict, for example, a green color or a welcome message. The second image 320, like the first image 315, is infinitely customizable with colors, texts, patterns, etc. The text of the second image 320 can even include personal information relating to the user of the designated vehicle 310 or specific information about the designated vehicle 310 that is obtained from the user profile stored in the parking application 250.

If, on the other hand, the approaching vehicle 105 is determined to not be the designated vehicle 310 associated with the reserved parking space 305, then the second image 320 indicates that the approaching vehicle 105 is not permitted to park in the reserved parking space 305. In such circumstances, the projection systems 175 also may continue to project the first image 310, which indicates that the approaching vehicle 105 should not park in the reserved parking space 305, rather than projecting the second image 320.

In one or more embodiments, the parking garage 285 may not utilize the reservation aspect of the parking application 250 but may still utilize the identification of open parking spaces 295 aspect. In such embodiments, the sensor systems 180 identify open parking spaces 295 as described above. Then, as vehicles 105 enter and navigate the parking garage 285 in search of an open parking space 295, the projection systems 175 project an image onto the open parking spaces

295 indicating that the vehicle 150 navigating the parking garage 285 is permitted to park in the open parking spaces 295.

The projection of a color or message onto the open parking spaces 295 makes the process of identifying an open parking space 295 much more efficient and streamlined. As a vehicle 105 drives down an aisle of a parking garage 285, the projections enable the user of the vehicle 150 to visually identify the open parking spaces 295 from a greater distance than would traditionally be possible, including recognizing open parking spaces 295 further down the aisle or in another aisle.

In one or more embodiments, the parking space identification system 100 can also identify when an unauthorized vehicle (i.e., a vehicle not associated with a reserved parking space 305) parks in a reserved parking space 305. Using the sensor systems 180, the V2V and V2I communication systems 220,225, and the parking application 250, the additional vehicles 115 and the infrastructure 120 adjacent the reserved parking space 305 can determine that an unauthorized vehicle has parked in the reserved parking space 305. In such circumstances, it is communicated to the designated vehicle 310 via the parking application 250 that the reserved parking space 305 is occupied. Along with this notice, the parking application 250 can prompt the designated vehicle 310, or the user of the designated vehicle 310 or mobile device 125, to reserve a different open parking space 295. The parking application 250 may provide a list of alternative open parking spaces 295 that can be reserved. In one or more embodiments, the parking application 250 can automatically change the reservation to a different reserved parking space when it is determined that the reserved parking space 305 is improperly occupied.

In one or more other embodiments, when the additional vehicles 115 and the infrastructure 120 determine that the reserved parking space 305 has been occupied by a vehicle other than the designated vehicle 310, the additional vehicles 115 and the infrastructure 120 may utilize visual and audible alerts in an attempt to alert the driver of the unauthorized vehicle to the fact that it has improperly parked in a reserved parking space 305. In one or more embodiments, the visual alerts include using the projection systems 175 of the additional vehicles 115 and of the infrastructure 120 to project or flash lights and messages indicating that the unauthorized vehicle should be moved. In one or more embodiments, the audible alerts may include use of respective audio/video systems 170 and alarms of the additional vehicles 115 and of the infrastructure 120 to alert the driver of the unauthorized vehicle and indicate that the unauthorized vehicle should be moved.

In one or more embodiments, the amount of natural and artificial light in the parking garages 285 and parking lots may vary. The amount of light in the parking garages 285 and parking lots will affect the visibility of the images projected onto the parking spaces 290. For example, in parking garages 285 and parking lots that have better lighting, the images from the projections may be at risk of being washed out or diluted by the light and may be less visible. As such, in one or more embodiments, the projection systems 175 may be equipped with automatic brightness adjusters that can increase the brightness of the projections in well-lit parking garages and parking lots, and which can decrease the brightness of the projections in darker parking garages and parking lots. Reducing the brightness of the projections when possible can also reduce energy consumption and battery drain.

Figure 5:
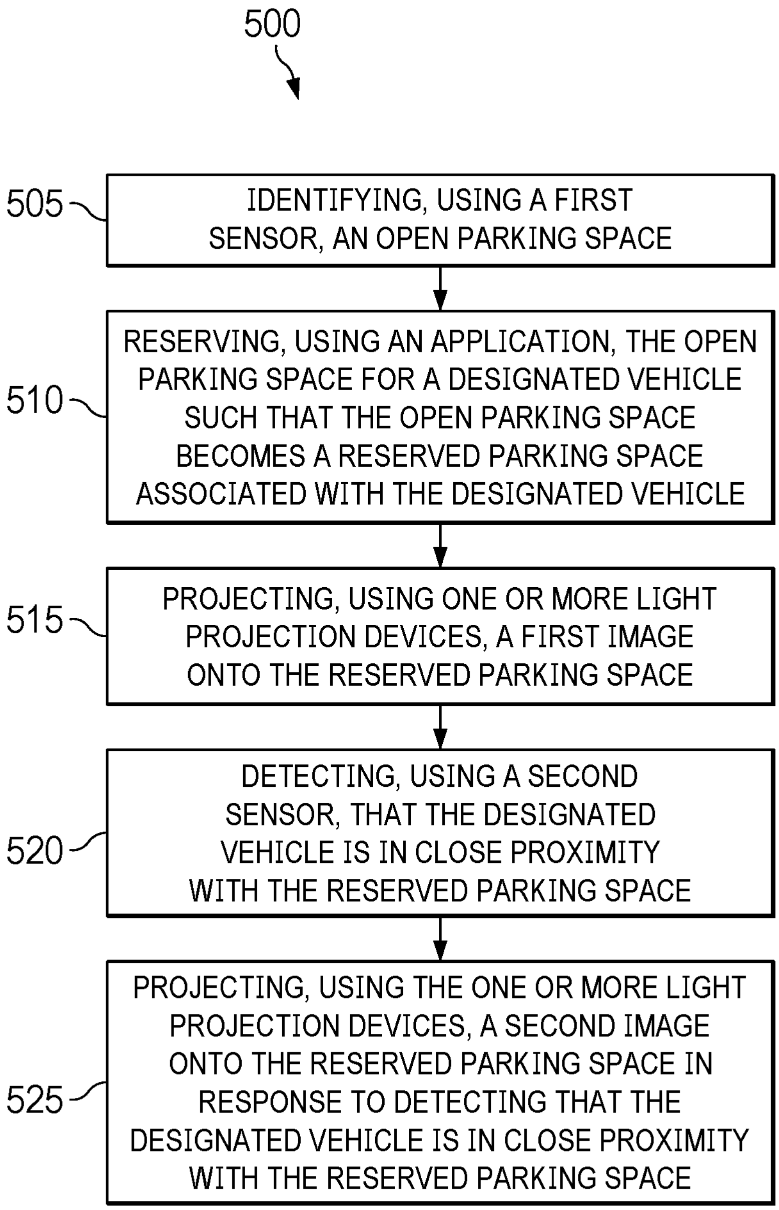
FIG. 5 is a flow chart of a method for identifying and reserving the open parking space, according to one or more embodiments of the present disclosure.

In view of the foregoing, FIG. 5 is a flow chart of a method 500 for identifying and reserving a parking space, according to certain illustrative embodiments of the present disclosure. Method 500 may be performed by one or more of the various computing devices of the parking space identification system 100, as described herein. At block 505, the parking space identification system 100 identifies, using a first sensor, an open parking space. As described above, the first sensor may be associated with the sensor system of one or more vehicles or infrastructure. The first sensor may scan the environment surrounding the first sensor by sending out signals and using those signals to determine the presence, or absence, of vehicles in parking spaces adjacent to the sensor. If the parking space is empty, the sensor generates open parking space information for the open parking spaces.

At block 510, the parking application is used to reserve one of the open parking spaces identified by the first sensor. As described above, the open parking space information is communicated across the network that communicatively couples the first senor, the infrastructure, the one or more vehicles, mobile devices, and the remote computing device. The user is then able to access the parking application via the vehicle or the mobile device. Using the parking application, the user can reserve one of the open parking spaces. Once the open parking space is reserved, it becomes a reserved parking space associated with the user and the user's vehicle, which becomes the designated vehicle with respect to the reserved parking space.

At block 515, using one or more light projection devices of the projection system, a first image is projected onto the reserved parking space. The first image indicates that the parking space is reserved. The first image may specifically indicate that the reserved parking space should not be occupied by any vehicle other than the designated vehicle.

At block 520, using a second sensor, the designated vehicle is detected to be in close proximity with the reserved parking space. As described above, the second sensor may be associated with the senor systems of the additional vehicles and of the infrastructure. The second sensor may also be associated with the V2V communication systems or the V2I communication systems of the additional vehicles and of the infrastructure. At this block, it is determined whether the designated vehicle is approaching the reserved parking space or whether an unauthorized vehicle is approaching the reserved parking space.

At block 525, using the one or more light projection devices, a second image is projected onto the reserved parking space in response to the second sensor detecting that the designated vehicle is in close proximity with the reserved parking space. The first image indicated that the reserved parking space was reserved and that it should not be parked in. Once the designated vehicle is detected at block 520 by the second senor to be in close proximity to the reserved parking space, the first image is replaced by the second image which visually indicates to the designated vehicle and its user that the designated vehicle is authorized to park in the reserved parking space. As described above, if the second sensor does not detect the designated vehicle in close proximity to the reserved parking space, the projection system will continue to project the first image instead of projecting the second image.

Figure 6:
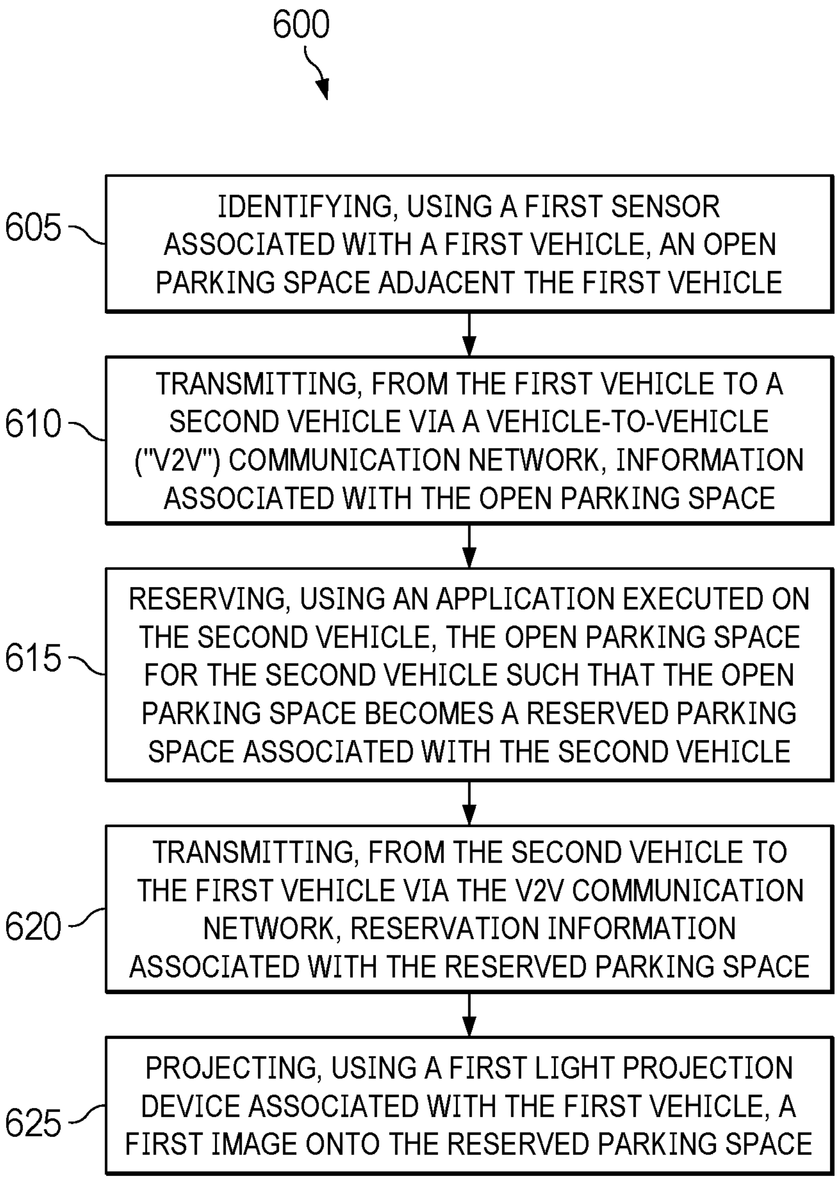
FIG. 6 is a flow chart of a second method for identifying and reserving the open parking space, according to one or more embodiments of the present disclosure.

FIG. 6 is a flow chart of a method 600 for identifying and reserving a parking space, according to certain illustrative embodiments of the present disclosure. Method 600 may be performed by one or more of the various computing devices of the parking space identification system 100, as described herein. At block 605, the parking space identification system 100 identifies, using a first sensor associated with a first vehicle, an open parking space adjacent the first vehicle. At block 610, information associated with the open parking space is transmitted from the first vehicle to a second vehicle via a V2V communication network (or system). At block 615, using a parking application executed on the second vehicle, the open parking is reserved for the second vehicle such that the open parking space becomes a reserved parking space associated with the second vehicle. At block 620, reservation information associated with the reserved parking space is transmitted from the second vehicle to the first vehicle via the V2V communication network. At block 625, a first image is projected onto the reserved parking space using a first light projection device associated with the first vehicle.

Figure 7:
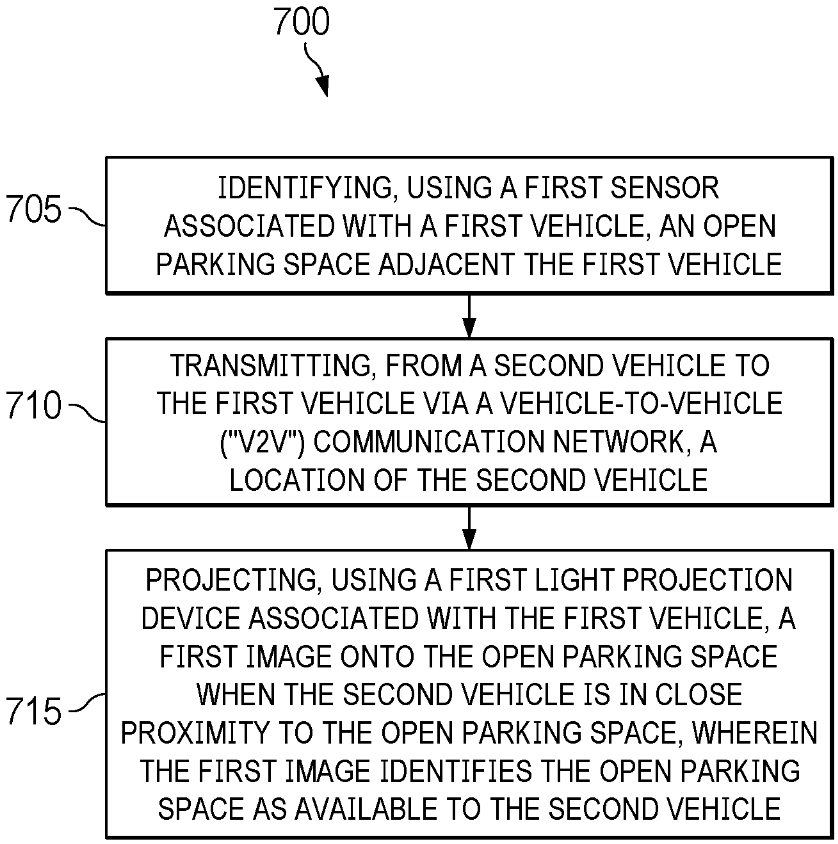
FIG. 7 is a flow chart of a third method for identifying the open parking space, according to one or more embodiments of the present disclosure.

FIG. 7 is a flow chart of a method 700 for identifying a parking space, according to certain illustrative embodiments of the present disclosure. Method 700 may be performed by one or more of the various computing devices of the parking space identification system 100, as described herein. At block 705, the parking space identification system 100 identifies, using a first sensor associated with a first vehicle, an open parking space adjacent the first vehicle. At block 710, a location of a second vehicle is transmitted from the second vehicle to the first vehicle via a V2V communication network. At block 715, using a first light projection device associated with the first vehicle, a first image is projected onto the open parking space when the second vehicle is in close proximity to the open parking space. The first image identifies the open parking space as available to the second vehicle.

Although various embodiments and methods have been shown and described, the disclosure is not limited to such embodiments and methods and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A computer-implemented method for identification of a reserved parking space, comprising:
- identifying, using one or more sensors associated with a first vehicle, an open parking space adjacent the first vehicle;
- reserving, using an application and based on the identification of the open parking space using the one or more sensors associated with the first vehicle, the open parking space for a designated vehicle such that the open parking space becomes a reserved parking space associated with the designated vehicle;
- transmitting, from the designated vehicle to the first vehicle via a vehicle-to-vehicle ("V2V") communication network, reservation information associated with the reserved parking space; and
- projecting, using one or more light projection devices associated with the first vehicle and based on the reservation information associated with the reserved parking space, a first image onto the reserved parking space.

2. The computer-implemented method of claim 1, further comprising identifying, using one or more sensors associated with infrastructure adjacent the open parking space, the open parking space.

3. The computer-implemented method of claim 1, further comprising:
- transmitting information associated with the open parking space from the first vehicle to a server in communication with the application.

4. The computer-implemented method of claim 1, wherein the application is executed on the designated vehicle.

5. The computer-implemented method of claim 1, wherein the application is executed on a mobile device.

6. The computer-implemented method of claim 2, further comprising:
- transmitting information associated with the reserved parking space from the infrastructure to a server in communication with the application and the first vehicle.

7. The computer-implemented method of claim 1, further comprising:
- projecting, using one or more light projection devices associated with infrastructure adjacent the reserved parking space and based on the reservation information associated with the reserved parking space, the first image onto the reserved parking space, wherein the first image projected using the one or more light projection devices associated with the infrastructure aligns with the first image projected using the one or more light projection devices associated with the first vehicle.

8. The computer-implemented method of claim 1,
- wherein the first image projected, using the one or more light projection devices associated with the first vehicle is projected onto the reserved parking space prior to the designated vehicle being in close proximity to the reserved parking space; and
- wherein the method further comprises:
  - replacing, using the one or more light projection devices associated with the first vehicle, the first image projected onto the reserved parking space with a second image projected onto the reserved parking space when the designated vehicle is in close proximity to the reserved parking space, wherein the second image is different from the first image.

9. The computer-implemented method of claim 1, further comprising:
- adjusting, using the one or more light projection devices, a brightness of the first image projected onto the reserved parking space.

10. A computer-implemented method for identification of a reserved parking space, comprising:
- identifying, using a first sensor associated with a first vehicle, an open parking space adjacent the first vehicle;
- transmitting, from the first vehicle to a second vehicle via a vehicle-to-vehicle ("V2V") communication network, information associated with the open parking space;
- reserving, using an application executed on the second vehicle, the open parking space for the second vehicle such that the open parking space becomes a reserved parking space associated with the second vehicle;
- transmitting, from the second vehicle to the first vehicle via the V2V communication network, reservation information associated with the reserved parking space; and
- projecting, using a first light projection device associated with the first vehicle, a first image onto the reserved parking space.

11. The computer-implemented method of claim 10, further comprising:

identifying, using a second sensor associated with infrastructure, the open parking space adjacent the infrastructure.

12. The computer-implemented method of claim 11, further comprising:

transmitting, from the infrastructure to the second vehicle via a vehicle-to-infrastructure ("V2I") communication network, the information associated with the open parking space.

13. The computer-implemented method of claim 12, further comprising:

transmitting, from the second vehicle to the infrastructure via the V2I communication network, the reservation information associated with the reserved parking space.

14. The computer-implemented method of claim 13, further comprising:

projecting, using a second light projection device associated with the infrastructure, the first image onto the reserved parking space.

15. The computer-implemented method of claim 10, further comprising:

projecting, using the first light projection device, a second image onto the reserved parking space when the second vehicle is in close proximity to the reserved parking space;

wherein the second image is different from the first image.

16. A computer-implemented method for identification of an open parking space, comprising:

identifying, using a first sensor associated with a first vehicle, an open parking space adjacent the first vehicle;

transmitting, from a second vehicle to the first vehicle via a vehicle-to-vehicle ("V2V") communication network, a location of the second vehicle;

projecting, using a first light projection device associated with the first vehicle, a first image onto the open parking space when the second vehicle is in close proximity to the open parking space;

wherein the first image identifies the open parking space as available to the second vehicle.

17. The computer-implemented method of claim 16, further comprising:

identifying, using a second sensor associated with a third vehicle, a second open parking space adjacent the third vehicle;

transmitting, from the second vehicle to the third vehicle via the V2V communication network, the location of the second vehicle;

projecting, using a second light projection device associated with the third vehicle, a second image onto the second open parking space when the second vehicle is in close proximity to the second open parking space;

wherein the second image identifies the second open parking space as available to the second vehicle.

18. The computer-implemented method of claim 17, wherein the first image and the second image are projected simultaneously onto the first open parking space and the second open parking space, respectively, when the second vehicle is in close proximity to both the first open parking space and the second open parking space.

* * * * *